(12) United States Patent
Luo et al.

(10) Patent No.: US 12,524,149 B2
(45) Date of Patent: Jan. 13, 2026

(54) MEMORY CHIP

(71) Applicant: WUHAN XINXIN SEMICONDUCTOR MANUFACTURING CO., LTD., Hubei (CN)

(72) Inventors: Yini Luo, Hubei (CN); Sahun Song, Hubei (CN)

(73) Assignee: WUHAN XINXIN SEMICONDUCTOR MANUFACTURING CO., LTD., Wuhan (CN)

( * ) Notice: Subject to any disclaimer, the term of this patent is extended or adjusted under 35 U.S.C. 154(b) by 416 days.

(21) Appl. No.: 18/085,589

(22) Filed: Dec. 21, 2022

(65) Prior Publication Data

US 2024/0111415 A1 Apr. 4, 2024

(30) Foreign Application Priority Data

Sep. 29, 2022 (CN) .......................... 202211204502.7

(51) Int. Cl.
*G06F 3/06* (2006.01)

(52) U.S. Cl.
CPC .......... *G06F 3/0604* (2013.01); *G06F 3/0653* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 7,610,437 B2* | 10/2009 | Sinclair | ................ | G06F 3/0652 711/104 |
| 7,984,084 B2* | 7/2011 | Sinclair | ............... | G06F 16/1847 707/818 |
| 8,285,918 B2* | 10/2012 | Maheshwari | ........ | G11C 7/1072 711/159 |
| 8,443,263 B2* | 5/2013 | Selinger | ............. | G06F 11/1068 714/768 |
| 8,873,284 B2* | 10/2014 | Sinclair | ............... | G06F 12/0246 365/185.11 |
| 9,223,693 B2* | 12/2015 | Sinclair | ............... | G06F 12/0246 |
| 9,336,133 B2* | 5/2016 | Sinclair | ............... | G06F 12/0246 |
| 9,348,746 B2* | 5/2016 | Sinclair | ............... | G06F 12/0246 |
| 9,465,731 B2* | 10/2016 | Sinclair | ............... | G06F 12/0246 |
| 9,652,382 B1* | 5/2017 | Subramanian | ...... | G06F 12/0253 |
| 9,734,050 B2* | 8/2017 | Sinclair | ............... | G06F 12/0253 |
| 9,734,911 B2* | 8/2017 | Sinclair | ................ | G06F 3/0658 |
| 9,778,855 B2* | 10/2017 | Sinclair | ................... | G06F 3/064 |
| 10,108,543 B1* | 10/2018 | Duggal | ................... | G06F 11/14 |
| 10,108,544 B1* | 10/2018 | Duggal | ................... | G06F 11/14 |
| 10,120,613 B2* | 11/2018 | Sinclair | ................. | G06F 12/02 |
| 10,133,490 B2* | 11/2018 | Sinclair | ................. | G06F 3/0655 |

(Continued)

*Primary Examiner* — Christopher D Birkhimer
(74) *Attorney, Agent, or Firm* — Rivka Friedman

(57) ABSTRACT

The present application discloses a memory chip. The memory chip includes a nonvolatile status register and a control circuit. The nonvolatile status register includes a plurality of groups of registers, each group of the registers includes a flag register and at least one data register, the control circuit is connected to the nonvolatile status register, and is configured to control writing times of the nonvolatile status register being greater than erasing times of the nonvolatile status register.

19 Claims, 4 Drawing Sheets

(56) References Cited

U.S. PATENT DOCUMENTS

| | | | |
|---|---|---|---|
| 10,255,179 B2* | 4/2019 | Ji | G06F 3/0659 |
| 10,430,279 B1* | 10/2019 | Dittia | G06F 3/0656 |
| 10,739,996 B1* | 8/2020 | Ebsen | G06F 16/1727 |
| 10,795,812 B1* | 10/2020 | Duggal | G06F 3/067 |
| 10,983,715 B2* | 4/2021 | Sharoni | G06F 21/79 |
| 11,086,537 B2* | 8/2021 | Byun | G06F 12/0253 |
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0189477 A1* | 8/2008 | Asano | G06F 12/0246 |
| | | | 711/E12.008 |
| 2010/0115220 A1* | 5/2010 | Lee | G11C 16/349 |
| | | | 711/E12.098 |
| 2011/0047347 A1* | 2/2011 | Li | G06F 12/0246 |
| | | | 711/201 |
| 2011/0145473 A1* | 6/2011 | Maheshwari | G11C 7/1072 |
| | | | 711/E12.008 |
| 2011/0161784 A1* | 6/2011 | Selinger | G06F 11/1016 |
| | | | 714/E11.002 |
| 2012/0072641 A1* | 3/2012 | Suzuki | G06F 3/064 |
| | | | 711/E12.008 |
| 2012/0096217 A1* | 4/2012 | Son | G06F 12/0246 |
| | | | 711/E12.008 |
| 2014/0006688 A1* | 1/2014 | Yu | G06F 12/0246 |
| | | | 365/185.03 |
| 2014/0089565 A1* | 3/2014 | Lee | G06F 3/061 |
| | | | 711/103 |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2015/0227602 A1* | 8/2015 | Ramu | G06F 11/1456 |
| | | | 707/634 |
| 2016/0246713 A1* | 8/2016 | Choi | G06F 3/0608 |
| 2017/0123655 A1* | 5/2017 | Sinclair | G06F 3/061 |
| 2017/0242790 A1* | 8/2017 | O'Krafka | G06F 3/0652 |
| 2018/0189175 A1* | 7/2018 | Ji | G06F 3/0679 |
| 2019/0141128 A1* | 5/2019 | Hallak | H04L 67/1097 |
| 2020/0089420 A1* | 3/2020 | Sharoni | G06F 21/79 |
| 2020/0192794 A1* | 6/2020 | Lee | G06F 12/0246 |
| 2020/0218653 A1* | 7/2020 | Ryu | G06F 12/0253 |
| 2020/0234776 A1* | 7/2020 | Yamada | G06F 13/1668 |
| 2020/0310686 A1* | 10/2020 | Truong | G06F 3/061 |
| 2021/0303173 A1* | 9/2021 | Wu | G06F 3/0611 |
| 2021/0342362 A1* | 11/2021 | Haravu | G06F 11/1464 |
| 2021/0406216 A1* | 12/2021 | Komatsu | G06F 16/11 |

* cited by examiner

MEMORY CHIP

CROSS-REFERENCE TO RELATED APPLICATIONS

The present application claims priority to Chinese Patent Application No. 202211204502.7, entitled "MEMORY CHIP", filed on Sep. 29, 2022 with the China National Intellectual Property Administration, which is incorporated herein by reference in their entireties.

TECHNICAL FIELD

The present application relates to a field of storage technology, specifically to a memory chip.

BACKGROUND

Nonvolatile status registers in memory chips are indispensable and important blocks in application. Wherein nonvolatile status bits in the nonvolatile status registers need to be highly reliable, that is, the nonvolatile status registers can still operate as well after a plurality of times (such as 6*1000000 times) of repetitive erasing.

However, erasing operations are performed before writing operations are performed in general schemes, that is, every writing operation follows an erasing operation. In this way, most storage units reach an upper limit of life after more than hundreds of thousands of times erasing operations are performed.

SUMMARY

The present application provides a memory chip to alleviate a technical problem of low reliability of nonvolatile status registers.

In a first aspect, the present application provides a memory chip, the memory chip includes a nonvolatile status register and a control circuit, the nonvolatile status register includes a plurality of groups of registers, each group of the registers includes a flag register and at least one data register; the control circuit is connected to the nonvolatile status register, and is configured to control the number of writing operations of the nonvolatile status register to be greater than the number of erasing operations of the nonvolatile status register.

In some embodiments, the control circuit is connected to the plurality of groups of the registers, and is configured to control the plurality of groups of the registers to perform the erasing operation once after performing the writing operations multiple times.

In some embodiments, the number of the writing operations performed between two continued erasing operations. is equal to the number of groups of the registers in the nonvolatile status register.

In some embodiments, the flag register in one group of the registers is configured to indicate a storage state of the at least one data register in the same group of the registers, and the storage state comprises one of a writable state and a written state.

In a second aspect, the present application provides a memory chip, the memory chip comprises a plurality of groups of registers, each group of the registers comprises a flag register and at least one data register, and the numbers of the at least one data registers in respective groups of the registers are equal; wherein at least two groups of the plurality of groups of registers are configured to respectively perform writing operations before one erasing operation is performed on the plurality of groups of registers once.

In some embodiments, after each group of the registers has performed one of the writing operations respectively, the erasing operation is performed on the plurality of groups of the registers once.

In some embodiments, the flag register in one group of the registers is configured to indicate a storage state of the same group of the registers, and the storage state comprises one of a writable state and a written state.

In some embodiments, the plurality of groups of the registers include a first group of the registers to a last group of the registers arranged according to an address sequence; the memory chip is configured to perform the following steps: reading the storage state of each group of the registers one by one according to the address sequence; judging whether the storage state of a current group of the registers that is currently read is the writable state; judging whether the current group of the registers is the first group of the registers if the storage state of the current group of the registers is the writable state; and directly writing data to be written to the current group of the registers if the current group of the registers is the first group of the registers.

In some embodiments, the memory chip is further configured to perform the following steps: recording stored data of each data register in a previous group, relative to the current group, of the registers to a buffer if the current group of the registers is not the first group of the registers; and writing the data to be written to the current group of the registers; wherein the data to be written comprises flag data, an un-updated part of the stored data stored in the buffer, and data to be updated, the flag data is written to the flag register in the current group of the registers, the un-updated part of the stored data stored in the buffer is written to data bits that correspond to the un-updated part and do not need to be updated in the current group of the registers, and the data to be updated is written to data bits that correspond to the data to be updated and need to be updated in the current group of the registers.

In some embodiments, the memory chip is further configured to perform the following steps: judging whether the current group of the registers is the last group of the registers if the storage state of the current group of the registers is not the writable state; and scanning the storage state of a next group of the registers if the current group of the registers is not the last group of the registers, and switching to the step of "judging whether the storage state of the current group of the registers is the writable state" as aforesaid.

In some embodiments, the memory chip is further configured to perform the following steps: performing the erasing operation on the plurality of groups of the registers after recording stored data of each of the data registers in the last group of the registers to a buffer, if the current group of the registers is the last group of the registers.

In some embodiments, the memory chip is further configured to perform the following steps: writing the data to be written to the first group of the registers; wherein the data to be written comprises flag data, an un-updated part of the stored data stored in a buffer, and data to be updated, the flag data is written to the flag register in the first group of the registers, the un-updated part of the stored data stored in the buffer is written to data bits that correspond to the un-updated part and do not need to be updated in the first group of the registers, and the data to be updated is written to data bits that correspond to the data to be updated and need to be updated in the first group of the registers.

In some embodiments, the flag data to be written in the current group of the registers is configured to indicate the storage state as the written state.

In some embodiment, the plurality of group of registers comprise N groups of the registers, and the at least one data register comprises M data register, wherein the N is an integer greater than or equal to 2, and the M is an integer greater than or equal to 1.

In the memory chip provided by the present application, the control circuit is configured to control all groups of the registers in the nonvolatile status register to perform the erasing operation once after at least one writing operation is performed on each group of the registers, which can achieve that the number of writing operations is greater than the number of erasing operations of the plurality of groups of registers, so that the number of the erasing operations can be reduced in a case that the number of the writing operations is unchanged, and thus reliability of the nonvolatile status register can be improved.

In addition, at least two groups of the registers perform the writing operations respectively before every erasing operation is performed, which can further achieved that the number of writing operations is greater than the number of erasing operations of the plurality of groups of the registers, so that the number of the erasing operations can be reduced in a case that the number of the writing operations is unchanged, and thus the reliability of the nonvolatile status register can be improved.

BRIEF DESCRIPTION OF DRAWINGS

Technical solutions and effects of the present application will be obvious through a detailed description of specific embodiments of the present application in combination with accompanying drawings.

DETAILED DESCRIPTION OF THE EMBODIMENT

Technical solutions in embodiments of the present application will be illustrated in combination with drawings in the embodiments of the present application clearly and completely. Obviously, the illustrated embodiments are only a part of the embodiments of the present application, not all of them. Based on the embodiments in the present application, all other embodiments obtained by those skilled in the art without creative effort belong to a scope of the present application.

Figure 1:
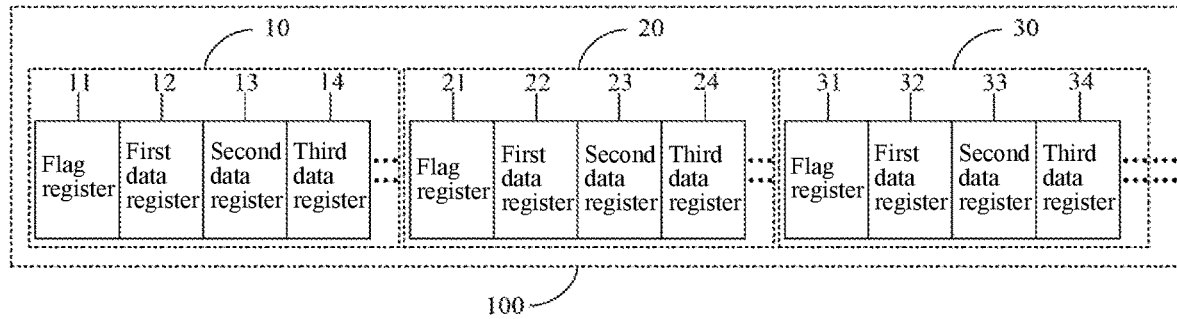
FIG. 1 is one schematic structural diagram of a memory chip provided by an embodiment of the present application.
Figure 2:
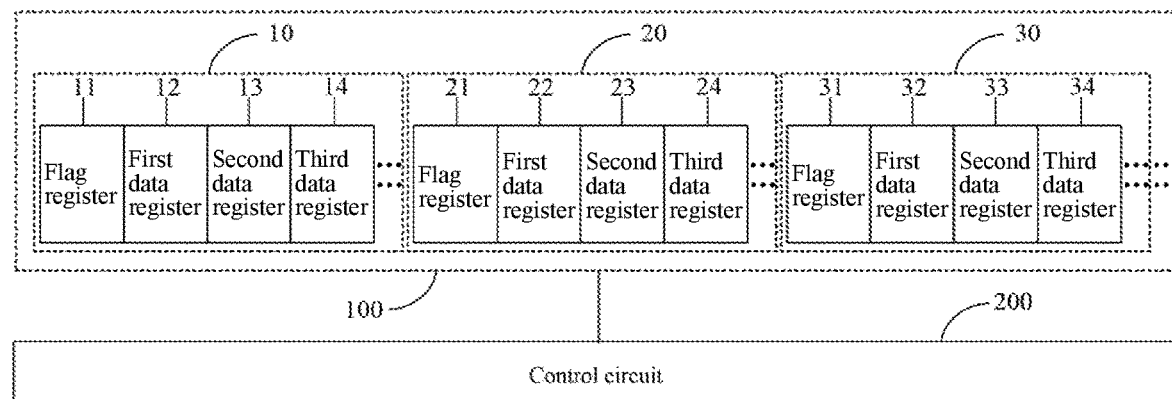
FIG. 2 is another schematic structural diagram of the memory chip provided by the embodiment of the present application.

The embodiment provides a memory chip. Please refer to FIG. 1 to FIG. 6. As shown in FIG. 1 and FIG. 2, the memory chip includes a nonvolatile status register 100 and a control circuit 200. The nonvolatile status register 100 includes a plurality of groups of registers, and each group of the registers includes a flag register and at least one data register. The control circuit 200 is connected to the nonvolatile status register 100. The control circuit 200 is configured to control writing times of the nonvolatile status register 100 being greater than erasing times of the nonvolatile status register 100.

In the memory chip provided by the present application, the control circuit 200 is configured to control all groups of the registers in the nonvolatile status register 100 to perform one erasing operation after each of the groups of the registers has respectively performed at least one writing operation, so that the number of the writing operations is greater than the number of the erasing operations in terms of the plurality of groups of registers. As a result, the number of the erasing operations can be reduced in a case that the number of the writing operations is unchanged, and thus reliability of the nonvolatile status register 100 can be improved.

It should be noted that, as shown in FIG. 1 and FIG. 2, the plurality of groups of the registers may include a first group of the registers 10 and a second group of the registers 20. After two writing operations are performed on the first group of the registers 10 and the second group of the registers 20 respectively, the first group of the registers 10 and the second group of the registers 20 are both erased in one erasing operation, so that the writing count of the nonvolatile status register 100 is 2, and the erasing count of the nonvolatile status register 100 is 1, which can achieve a result that the number of the writing operations of the nonvolatile status register 100 is greater than the number of the erasing operations of the nonvolatile status register 100, and thus reliability of the nonvolatile status register 100 can be improved.

Wherein "a plurality of" in the present application represents two or more than two.

The plurality of groups of the registers may further include a third group of the registers 30. After the writing operations are performed on the first group of the registers 10, the second group of the registers 20, and the third group of the registers 30, respectively, the first group of the registers 10, the second group of the registers 20, and the third group of the registers 30 are erased once in one erasing operation, so that the writing count of the nonvolatile status register 100 is 3, and the erasing count of the nonvolatile status register 100 is 1, which can achieve the writing count of the nonvolatile status register 100 being greater than the erasing count of the nonvolatile status register 100, and thus reliability of the nonvolatile status register 100 can be improved.

It can be understood that the plurality of groups of the registers may further include more groups of registers. Assuming that an upper limit of erasable count of each flag register or each data register is 300K, at least 32 times of writing operations can be performed when every erasing operation is performed if the nonvolatile status register 100 is configured with 32 groups of the registers. Correspondingly, equivalent erasing life of the nonvolatile status register 100 is 9.6 KK=32*300 K times, far exceeding actual erasing life of 300K times before the nonvolatile status register 100 is improved.

Wherein each group of the registers may include the flag register and the at least one data register. For example, in FIG. 1, the first group of the registers 10 includes a flag register 11, a first data register 12, a second data register 13, and a third data register 14. The second group of the registers 20 includes a flag register 21, a first data register 22, a second data register 23, and a third data register 24. The third group of the registers 30 includes a flag register 31, a first data register 32, a second data register 33, and a third data register 34. It can be noted that numbers of data registers in different groups of the registers may further be equal.

When the first group of the registers 10, the second group of the registers 20, and the third group of the registers 30 are arranged according to an address sequence, a number of the data registers in a back group of the registers is greater than a number of the data registers in a front group of the registers according to the address sequence. For example, in FIG. 2, the first group of the registers 10 may include the flag register 11, the first data register 12, etc.; the second group of the registers 20 may include the flag register 21, the first data register 22, the second data register 23, etc.; and the third group of the registers 30 may include the flag register 31, the first data register 32, the second data register 33, the third data register 34, etc. It can be noted that a number of the data registers in each group of the registers gradually increases according to the address sequence.

It should be noted that both two different configurations of registers in the above groups of the registers can realize data migration of same capacity between different groups of the registers.

Storage capacity of each flag register or each data register may be one or more bytes, or further be one or more bits. Wherein the flag register is configured to store flag data.

The above memory chip may be, but is not limited to, NOR Flash, or other applicable memory.

It should be noted that each of the writing operations represents the writing operation performed on a group of the registers, wherein only one time of the writing operation is performed in the same group of the registers after every erasing operation is performed. Each of the erasing operations represents the erasing operation performed on the nonvolatile status register 100, that is, the erasing operation is a step of erasing all stored data stored in a stored area in the nonvolatile status register 100.

Figure 3:
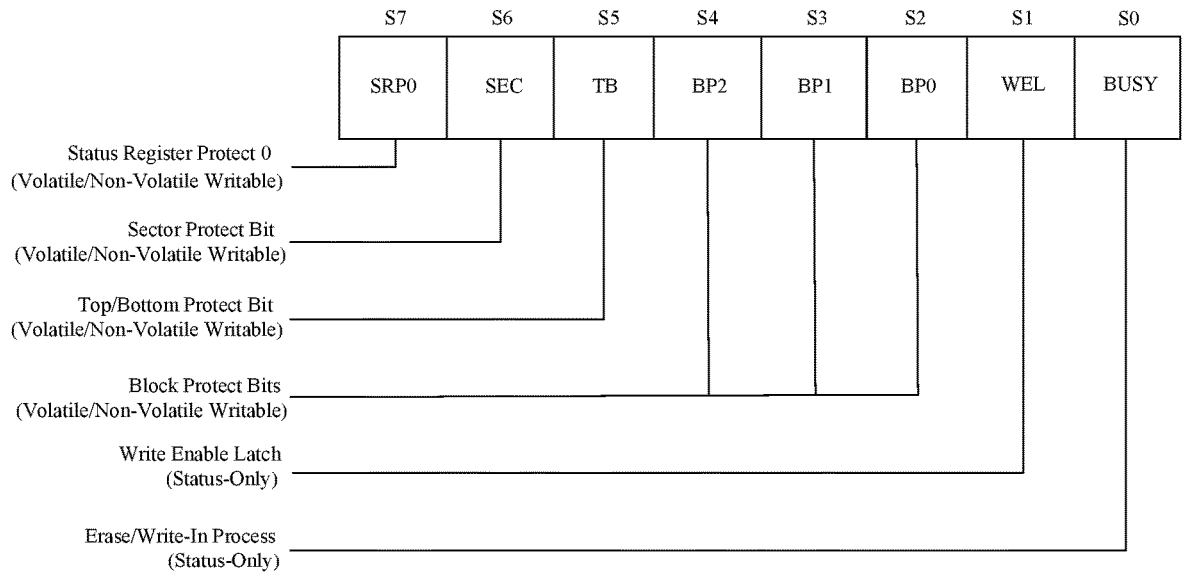
FIG. 3 is a first schematic structural diagram of a data register provided by the embodiment of the present application.

One data register may be as shown in FIG. 3. Storage capacity of the data register is a byte, that is, eight bits of S0-S7. Each bit of S0-S7 represents a function bit, for example, the function bit is configured to turn on or turn off corresponding functions, or further is configured to indicate states.

Figure 4:
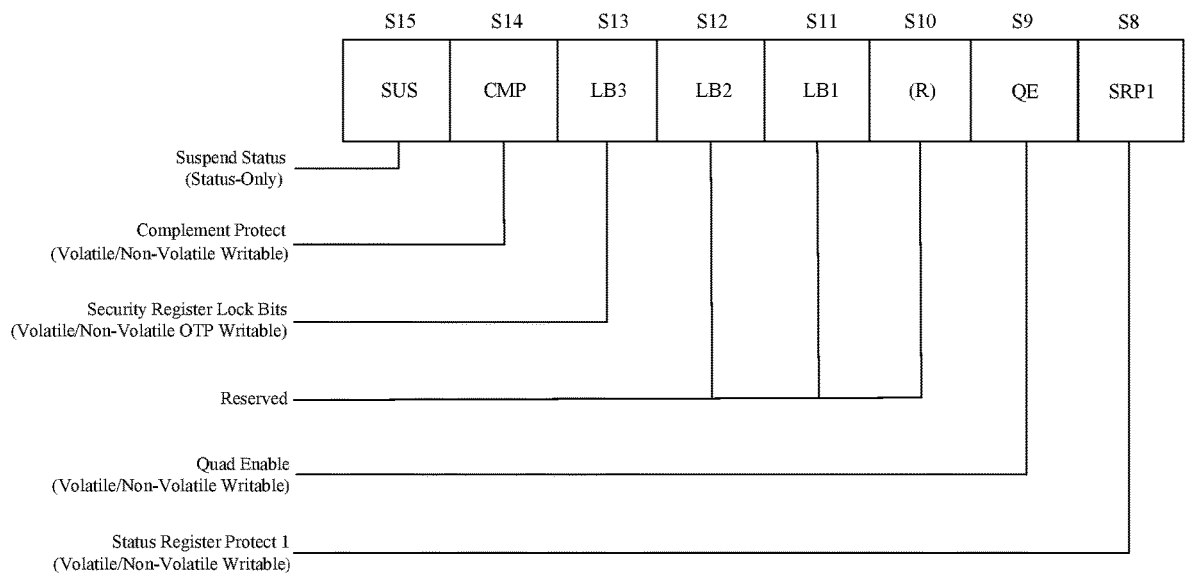
FIG. 4 is a second schematic structural diagram of the data register provided by the embodiment of the present application.

Another data register may be as shown in FIG. 4. Storage capacity of the data register is further a byte, that is, eight bits of S8-S15. Each bit of S8-S15 further represents a function bit, for example, the function bit is configured to turn on or turn off corresponding functions, or further is configured to indicate states. Wherein a bit of S10 is a reserved bit (R), and a function of the reserved bit is not defined in a design phase, which can be defined in subsequent use.

Figure 5:
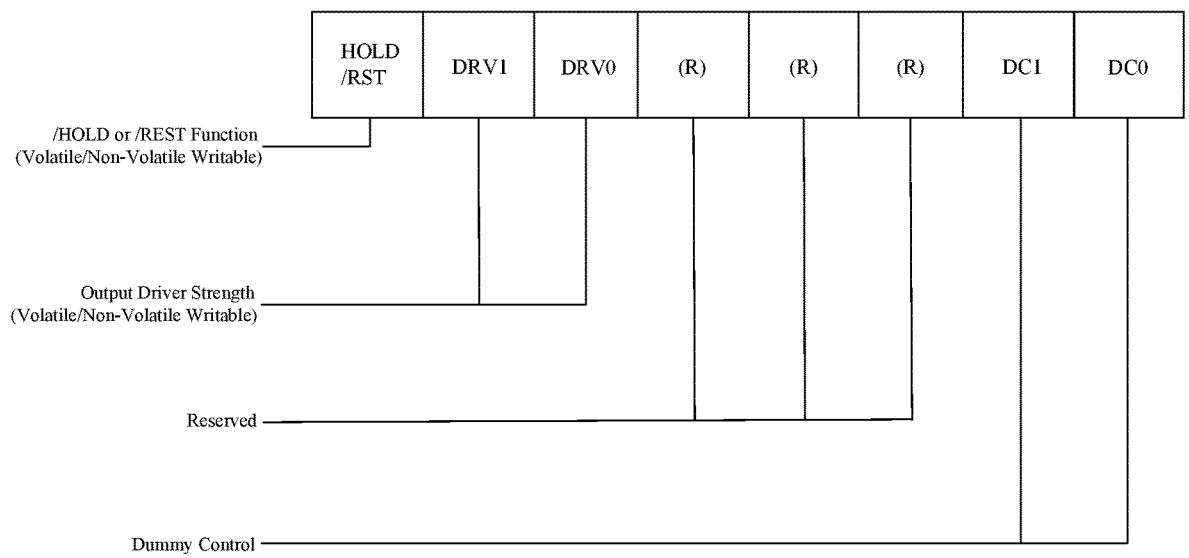
FIG. 5 is a third schematic structural diagram of the data register provided by the embodiment of the present application.

Another data register may be as shown in FIG. 5. Storage capacity of the data register is further a byte, that is, eight bits. Each bit is further a function bit or a reserved bit (R), for example, the function bit is configured to turn on or turn off corresponding functions, or further is configured to indicate states.

It should be noted that a data of QE in a bit of S9 of the data register shown in FIG. 4 is taken as an example for specific description. The data of QE being 1 represents entering a four wire mode, otherwise, represents entering a single wire or a double wire mode, and the data of QE will be updated repeatedly in an application process. That is, the data of QE being switched between 0 and 1 means that the data register shown in FIG. 4 is erased repeatedly.

In one embodiment, the control circuit 200 is connected to the plurality of groups of the registers, and is configured to control the plurality of groups of the registers to perform the erasing operation once after performing the writing operation multiple times.

It should be noted that the erasing operation performed one time represents the number of the erasing operations is 1, and the writing operation performed one time represents the number of the writing operations is 1. Each group of the registers performs the writing operation once before one erasing operation is sequentially performed, and a plurality of the writing operations may further be allowed to be performed on the plurality of groups of the registers. In this way, the number of writing operations being greater than the number of erasing operations of the nonvolatile status register 100 can be achieved, so that the number of the erasing operations can be reduced in the case that the number of the writing operations is unchanged, and thus the reliability of the nonvolatile status register 100 can be improved.

In one embodiment, the number of the groups of the registers in the nonvolatile status register is equal to the number of the writing operations performed during a period between two adjacent erasing operations.

It should be noted that each writing operation may be performed on at least one group of the registers. The embodiment describes an example of performing each writing operation on one group of the registers. The number of the groups of the registers in the nonvolatile status register 100 represents the number of the writing operations performed after the erasing operation is performed, or the number of the writing operations performed before the erasing operation is performed. In the embodiment, the number of the groups of the registers can be configured according to desired equivalent erasing life, which is conducive to accurately predicting the desired equivalent erasing life.

In one embodiment, the flag register is configured to indicate a storage state of the at least one data register in the same group of the registers, and the storage state includes one of a writable state and a written state.

It should be noted that different values stored in the flag register in each group of the registers may be configured to represent the storage state of the group of the registers. For example, a value stored in the flag register being 0xFF represents that the group of the registers is blank and in the writable state; a value stored in the flag register being 0x00 represents that the group of the registers has been written and is in the written state. Wherein 0xFF represents "FF" of hexadecimal "0x", which is 11111111 in binary. 0x00 represents "00" of hexadecimal "0x", which is 00000000 in binary.

In one embodiment, definitions of 00 (0x00) and FF (0xFF) of the stored data stored in the flag registers may be vary according to types of the flag registers, that is, 00 may indicate that the data register is in the writeable state, and the FF may indicate that the data register is in the written state. Therefore, simple changes of the values of the stored data stored in the flag registers may further be included in a scope of the present application.

An embodiment of the present application provides a memory chip. As shown in FIG. 1, the memory chip includes a plurality of groups of registers. Each group of the registers includes a flag register and at least one data register, and numbers of the data registers in different groups of the registers are equal. Wherein a writing operation is performed on at least two groups of the registers respectively before every erasing operation is performed.

In the memory chip provided by the embodiment, the writing operation is performed on at least two groups of the registers respectively before every erasing operation is performed, which can achieved that writing times of the plurality of groups of the registers is greater than erasing times of the plurality of groups of the registers, so that a number of times of the erasing operations can be reduced in a case of a number of times of the writing operations being unchanged, and thus reliability of the nonvolatile status register can be improved. The writing operation being performed on a group of the registers indicates that the writing operation is performed on at least one data register in the group of the registers.

It should be noted that flag bits may exist independently, and a number of the flag bits may be one or more, for example, the number of the flag bits may be eight. The flag bits may further be configured in the flag register, in this case, the number of the flag bits in each flag register may be eight, that is, storage capacity of each flag register may be one or more bytes.

An embodiment of the present application provides a memory chip. The memory chip includes N groups of registers, and each group of the registers includes a flag register and M data register.

It should be noted that the N may be an integer greater than or equal to 2. After each group of the registers has performed one writing operation, an erasing operation is performed on all groups of the registers, which can achieved that the number of writing operations is greater than the number of erasing operations for a plurality of groups of the registers, so that the number of the erasing operations can be reduced in the case that the number of the writing operations is unchanged, and thus reliability of nonvolatile status register can be improved.

The M may be an integer greater than or equal to 1.

In one embodiment, after each group of the registers has performed one writing operation, the erasing operation is performed once on the plurality of groups of the registers.

It should be noted that after the data registers in all groups of the registers have performed, group by group, the writing operations, the erasing operation will be performed on all groups of the registers once, which can prolong service life of the data registers.

In one embodiment, the flag register in one group of the registers is configured to indicate a storage state of the same group of the registers, and the storage state includes one of a writable state and a written state.

It should be noted that the storage state is the writable state if an above flag data of the flag register is 0xFF, and the storage state is the written state if the above flag data of the flag register is 0x00.

Figure 6:
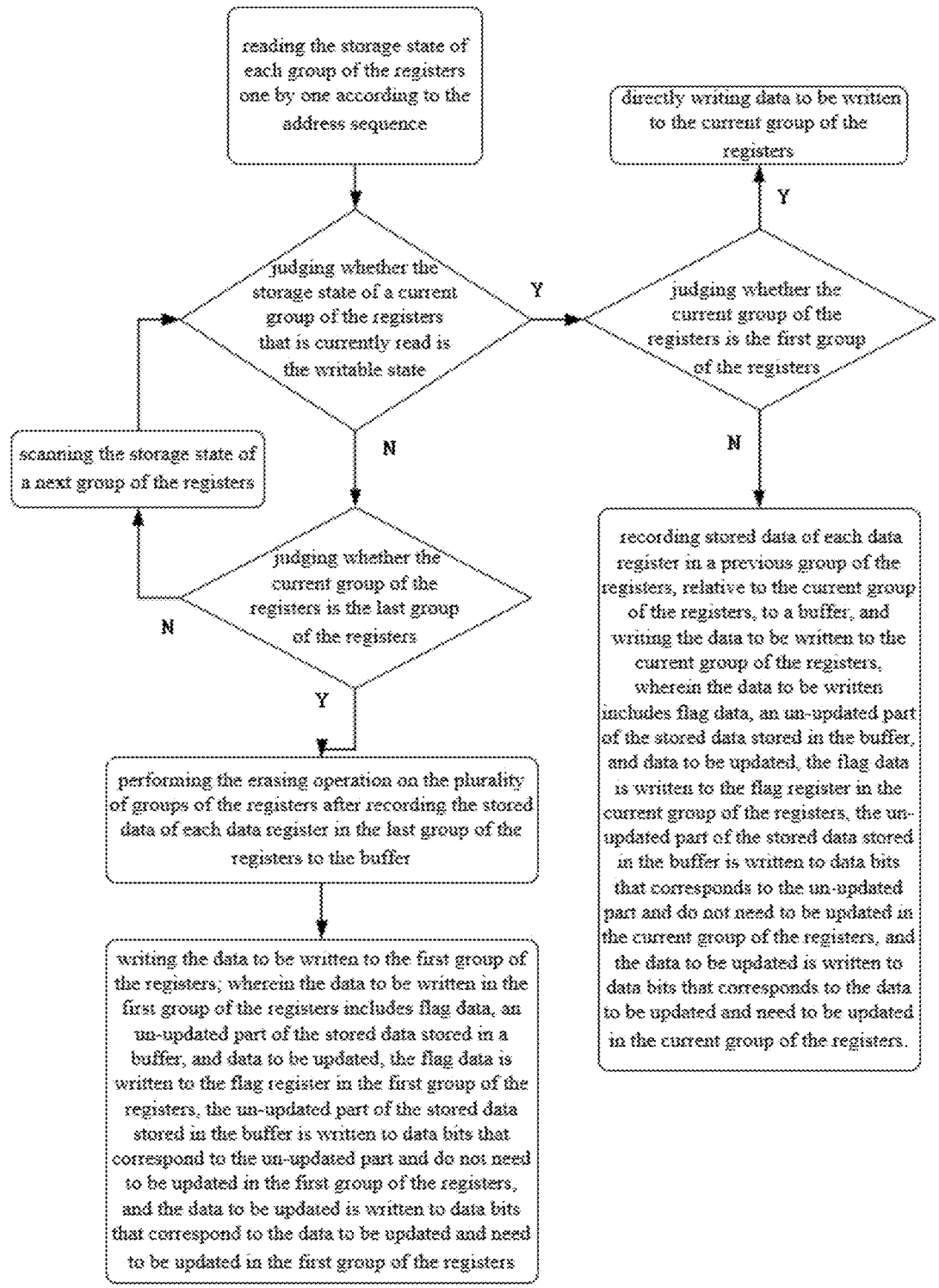
FIG. 6 is a flow chart of an operation of a memory chip provided by an embodiment of the present application.

In one embodiment, as shown in FIG. 6, a plurality of groups of the registers include a first group of the registers to a last group of the registers arranged according to an address sequence. The memory chip is configured to perform the following steps: reading the storage state of each group of the registers one by one according to the address sequence; judging whether the storage state of a current group of the registers that is currently read is the writable state; judging whether the current group of the registers is the first group of the registers if the storage state of the current group of the registers is the writable state; and directly writing data to be written to the current group of the registers if the current group of the registers is the first group of the registers.

It should be noted that the above address sequence may be from a first storage address of the first group of the registers to a last storage address of a last group of the registers. A first group of the registers to a last group of the registers in the plurality of groups of the registers corresponds to the first storage address to the last storage address respectively. The first group of the registers may correspond to the first storage address, etc., the last group of the registers corresponds to the last storage address. However, the address sequence of the first storage address to the last storage address may be arranged in a positive sequence, that is, from a lower address to a higher address, or in a reverse sequence, that is, from a higher address to a lower address.

Taking the memory chip shown in FIG. 1 as an example, since the first group of the registers 10 is the first group of the registers corresponding to the first storage address, and a storage state of the first group of the registers 10 is the writable state, therefore, the data to be written may be directly written to the first group of the registers 10. For example, the data to be written may be written to at least one of the first data register, the second data register, and the third data register, and "0x00" is written to the flag register 11 in the first group of the registers 10 to update the storage state of the first group of the registers 10.

In one embodiment, the memory chip is further configured to perform the following step: recording stored data of each data register in a previous group of the registers, relative to the current group of the registers, to a buffer if the current group of the registers is not the first group of the registers. In one embodiment, the stored data of each data register in the previous group of the registers adjacent to the current group of the registers is recorded to the buffer according to the address sequence, it can be understood that data registers are generally edited according to the address sequence for those skilled in the art. Of course, certain address segments may be skipped. The memory chip is further configured to perform the following step: writing the data to be written to the current group of the registers, wherein the data to be written includes flag data, an un-updated part of the stored data stored in the buffer, and data to be updated, the flag data is written to the flag register in the current group of the registers, the un-updated part of the stored data stored in the buffer is written to data bits that corresponds to the un-updated part and do not need to be updated in the current group of the registers, and the data to be updated is written to data bits that corresponds to the data to be updated and need to be updated in the current group of the registers.

It should be noted that in the embodiment, the flag data may be "0x00" to indicate the storage state of the current group of the registers as the written state.

Taking the memory chip shown in FIG. 1 as an example, the storage state of the second group of the registers 20 is the writable state. Since the second group of the registers 20 is not the first group of the registers corresponding to the first storage address, the stored data of each data register in the first group of the registers 10 need to be recorded to the buffer. Taking the stored data of the first data register 12, the second data register 13, and the third data register 14 in the first group of the registers 10 as 0xFF, 0xFD, and 0xFC, respectively, as an example, all data in the first group of the registers 10 need to be written from the buffer to a corresponding data register in the second group of the registers 20 except a data in a lowest bit of the first data register 12, if the data in the lowest bit of the stored data (0xFF represented as 11111111 in binary) in the first data register 12 is changed from 1 to 0. For example, the flag data of 0x00 in the data to be written is written to the flag register 21. Other data of 1111111 is correspondingly written to the first data register 22 except the data in the lowest bit of the first data register 12, the stored data of 0xFD of the second data register 13 is correspondingly written to the second data register 23, and the stored data of 0xFC of the third data register 14 is correspondingly written to the third data register 24. Wherein the data currently written to the first data register 22, the second data register 23, and the third data register 24 may be the un-updated part of the stored data stored in the buffer. 0 is needed to be written to the lowest bit of the first data register 22, and a data of 0 written to the lowest bit of the first data register 22 is the data to be updated in the above data to be written.

In one embodiment, as shown in FIG. 6, the memory chip is further configured to perform the following steps: judging whether the current group of the registers is the last group of the registers if the storage state of the current group of the registers is not the writable state; and scanning the storage state of a next group of the registers if the current group of the registers is not the last group of the registers, and switching to the step of "judging whether the storage state of the current group of the registers is the writable state" as aforesaid.

It should be noted that the storage state of the current group of the registers is not the writable state, that is, the storage state of the current group of the registers is the written state.

In one embodiment, as shown in FIG. 6, the memory chip is further configured to perform the following steps: performing the erasing operation on the plurality of groups of the registers after recording the stored data of each data register in the last group of the registers to the buffer, if the current group of the registers is the last group of the registers.

It should be noted that the erasing operation in the embodiment represents erasing all of storage areas where the plurality of groups of the registers are located.

In one embodiment, as shown in FIG. 6, the memory chip is further configured to perform the following steps: writing the data to be written to the first group of the registers; wherein the data to be written in the first group of the registers includes flag data, an un-updated part of the stored data stored in a buffer, and data to be updated, the flag data is written to the flag register in the first group of the registers, the un-updated part of the stored data stored in the buffer is written to data bits that correspond to the un-updated part and do not need to be updated in the first group of the registers, and the data to be updated is written to data bits that correspond to the data to be updated and need to be updated in the first group of the registers.

It should be noted that the flag data may be "0x00" to indicate the storage state of the first group of the registers as the written state in the embodiment.

In the embodiment, when the storage state of the last group of the registers is the written state, it means that the storage state of all current groups of the registers are the written state, that is, no blank groups of the registers are capable to store the data to be written. Therefore, the erasing operation is needed to enable the data to be written to be written to the first group of the registers corresponding to the first storage address.

In the above embodiments, the description of each embodiment has its own emphasis. For parts not detailed in one embodiment, please refer to relevant description of other embodiments.

The above describes the memory chip provided by the embodiments of the present application in detail. In the present application, specific examples are used to describe a principle and an implementation mode of the present application. The above description of the embodiments is only used to help understand technical solutions and a core idea of the present application; those skilled in the art should understand that they can still modify the technical solutions recorded in the aforementioned embodiments, or equivalent replace some of technical features; however, these modifications or substitutions do not make a nature of corresponding technical solutions separate from a scope of the present application.

What is claimed is:

1. A memory chip, comprising:
 a nonvolatile status register, wherein the nonvolatile status register comprises a plurality of groups of registers, each group of the registers comprises a flag register and at least one data register; and
 a control circuit, wherein the control circuit is connected to the nonvolatile status register, and is configured to control the number of writing operations of the nonvolatile status register to be greater than the number of erasing operations of the nonvolatile status register.

2. The memory chip according to claim 1, wherein the control circuit is connected to the plurality of groups of the registers, and is configured to control the plurality of groups of the registers to perform the erasing operation once after performing the writing operations multiple times.

3. The memory chip according to claim 2, wherein the number of the writing operations performed between two continued erasing operations is equal to the number of groups of the registers in the nonvolatile status register.

4. The memory chip according to claim 1, wherein the flag register in one group of the registers is configured to indicate a storage state of the at least one data register in the same group of the registers, and the storage state comprises one of a writable state and a written state.

5. The memory chip according to claim 4, wherein the storage state is the writable state if a flag data of the flag register is 0xFF or 1; and the storage state is the written state if the flag data of the flag register is 0x00 or 0.

6. The memory chip according to claim 1, wherein after each group of the registers has performed one writing operation respectively, one erasing operation is performed on the plurality of groups of registers.

7. The memory chip according to claim 1, wherein the numbers of the at least one data register in respective groups of the registers are equal.

8. The memory chip according to claim 1, wherein the plurality of groups of the registers are arranged in a memory array according to an address sequence.

9. The memory chip according to claim 1, wherein each of the writing operations represents a writing operation performed on at least one group of the registers; each of the erasing operations represents an erasing operation performed on the whole nonvolatile status register, and the erasing operation is a step of erasing all data stored in a memory area where the nonvolatile status register is located.

10. A memory chip, wherein the memory chip comprises a plurality of groups of registers, each group of the registers comprises a flag register and at least one data register, and the numbers of the at least one data registers in respective groups of the registers are equal; and
 wherein at least two groups of the plurality of groups of registers are configured to respectively perform writing operations before one erasing operation is performed on the plurality of groups of registers once.

11. The memory chip according to claim 10, wherein after each group of the registers has performed one of the writing operations respectively, the erasing operation is performed on the plurality of groups of the registers once.

12. The memory chip according to claim 10, wherein the flag register in one group of the registers is configured to indicate a storage state of the same group of the registers, and the storage state comprises one of a writable state and a written state.

13. The memory chip according to claim 12, wherein the plurality of groups of the registers comprise a first group of the registers to a last group of the registers arranged according to an address sequence; the memory chip is configured to perform the following steps: reading the storage state of each group of the registers one by one according to the address sequence; judging whether the storage state of a current group of the registers that is currently read is the writable state; judging whether the current group of the registers is the first group of the registers if the storage state of the current group of the registers is the writable state; and directly writing data to be written to the current group of the registers if the current group of the registers is the first group of the registers.

14. The memory chip according to claim 13, wherein the memory chip is further configured to perform the following steps: recording stored data of each data register in a previous group, relative to the current group, of the registers to a buffer if the current group of the registers is not the first group of the registers; and writing the data to be written to the current group of the registers; wherein the data to be written comprises flag data, an un-updated part of the stored data stored in the buffer, and data to be updated, the flag data is written to the flag register in the current group of the registers, the un-updated part of the stored data stored in the buffer is written to data bits that correspond to the un-updated part and do not need to be updated in the current group of the registers, and the data to be updated is written to data bits that correspond to the data to be updated and need to be updated in the current group of the registers.

15. The memory chip according to claim 13, wherein the memory chip is further configured to perform the following steps: judging whether the current group of the registers is the last group of the registers if the storage state of the current group of the registers is not the writable state; and scanning the storage state of a next group of the registers if the current group of the registers is not the last group of the registers, and switching to the step of "judging whether the storage state of the current group of the registers is the writable state" as aforesaid.

16. The memory chip according to claim 15, wherein the memory chip is further configured to perform the following steps: performing the erasing operation on the plurality of groups of the registers after recording stored data of each of the data registers in the last group of the registers to a buffer, if the current group of the registers is the last group of the registers.

17. The memory chip according to claim 16, wherein the memory chip is further configured to perform the following steps: writing the data to be written to the first group of the registers; wherein the data to be written comprises flag data, an un-updated part of the stored data stored in a buffer, and data to be updated, the flag data is written to the flag register in the first group of the registers, the un-updated part of the stored data stored in the buffer is written to data bits that correspond to the un-updated part and do not need to be updated in the first group of the registers, and the data to be updated is written to data bits that correspond to the data to be updated and need to be updated in the first group of the registers.

18. The memory chip according to claim 14, wherein the flag data to be written in the current group of the registers is configured to indicate the storage state as the written state.

19. The memory chip according to claim 10, wherein the plurality of groups of registers comprise N groups of the registers, and the at least one data register comprises M data register, wherein the N is an integer greater than or equal to 2, and the M is an integer greater than or equal to 1.

* * * * *